(12) United States Patent
Diamond

(10) Patent No.: US 12,005,008 B2
(45) Date of Patent: Jun. 11, 2024

(54) ROUGH TERRAIN CART FOR A WHEEL CHAIR

(71) Applicant: Tyrel Diamond, Cobleskill, NY (US)

(72) Inventor: Tyrel Diamond, Cobleskill, NY (US)

(73) Assignee: Tyrel Diamond, Cobleskill, NY (US)

( * ) Notice: Subject to any disclaimer, the term of this patent is extended or adjusted under 35 U.S.C. 154(b) by 908 days.

(21) Appl. No.: 16/998,721

(22) Filed: Aug. 20, 2020

(65) Prior Publication Data

US 2021/0052444 A1 Feb. 25, 2021

Related U.S. Application Data

(60) Provisional application No. 62/889,159, filed on Aug. 20, 2019.

(51) Int. Cl.
*A61G 3/08* (2006.01)
*A61G 3/06* (2006.01)
*A61G 5/04* (2013.01)
*B60B 33/00* (2006.01)
*B60K 17/00* (2006.01)

(52) U.S. Cl.
CPC ............ *A61G 5/047* (2013.01); *A61G 3/061* (2013.01); *A61G 3/0808* (2013.01); *B60B 33/0018* (2013.01); *B60B 33/0042* (2013.01); *B60K 17/00* (2013.01)

(58) Field of Classification Search
CPC ........ A61G 3/061; A61G 3/0808; A61G 5/06; A61G 5/10; A61G 5/047; B60B 30/10; B60B 30/02; B60B 33/0018; B60B 33/0042; B60K 17/00; B60K 17/043; B60Y 2200/84
USPC .......................................... 180/198
See application file for complete search history.

(56) References Cited

U.S. PATENT DOCUMENTS 8,132,637 B1 * 3/2012 Watkins .................... A61G 3/06
180/198
10,912,686 B2 * 2/2021 Pierce ...................... B62B 3/10

* cited by examiner

*Primary Examiner* — Jacob D Knutson
*Assistant Examiner* — Felicia L. Brittman
(74) *Attorney, Agent, or Firm* — Heslin Rothenberg Farley & Mesiti P.C.

(57) ABSTRACT

A rough terrain cart for a wheel chair includes a frame operable to support a wheel chair and a wheel chair user. A pair of cart drive wheels are rotationally mounted to the frame. A locking mechanism is engaged with the frame. The locking mechanism is operable to secure the wheel chair to the cart. A rotational mechanism is engaged with the frame. The rotational mechanism is configured to support a pair of wheel chair drive wheels of the wheel chair and is operable to enable the wheel chair drive wheels to rotate when the wheel chair is secured to the cart by the locking mechanism. A transmission system is engaged with the frame. The transmission system is connectable to the wheel chair drive wheels. The transmission system is operable to transmit torque from the wheel chair drive wheels to the cart drive wheels.

21 Claims, 10 Drawing Sheets

ROUGH TERRAIN CART FOR A WHEEL CHAIR

CROSS-REFERENCE TO RELATED APPLICATION

This Patent Application claims priority to U.S. Provisional Patent Application No. 62/889,159, filed Aug. 20, 2019, and entitled Rough Terrain Cart For A Wheel Chair. The entire contents of the aforementioned application is hereby incorporated herein by reference.

TECHNICAL FIELD

The present disclosure relates to wheel chairs. More specifically, the disclosure relates to carts that may engage with a wheel chair to enable the wheel chair to be driven over rougher terrain than the wheel chair alone can be driven over.

BACKGROUND

Wheel chairs, such as motorized wheel chairs having four wheels or motorized scooters having three wheels, are used extensively by handicapped individuals (or users) for mobility. Many such wheel chairs are designed for traveling over smooth, or paved surfaces, such as, for example, the floors of a home, a city sidewalk or a grocery store.

However, wheel chairs designed to provide mobility over smooth surfaces have difficulty traversing rougher terrains. For example, a handicapped user may have difficulty driving his or her wheel chair over a sandy beach or down an unpaved path in a park. Additionally, it may be impractical to put the handicapped user and wheel chair in a separate motorized vehicle in order to travel over such rough terrain.

Also, wheel chairs configured as motorized three wheeled type scooters and wheel chairs configured as motorized four wheeled type wheel chairs have different dimensions. Those dimensional differences can provide a challenge for a single device to engage both motorized scooters and motorized wheel chairs in order to provide the capability of rougher terrain travel to both types of wheel chairs.

Accordingly, there is a need for a device that can engage a wheel chair to enable the wheel chair to be driven over rougher terrain. Further there is a need for a device that can be driven by the wheel chair's motorized system, rather than by a separate, independent motorized system. Additionally, there is a need for a device that can engage wheel chairs configured as both three wheeled scooters and four wheeled wheel chairs in order to provide the capability of rougher terrain travel to both types of wheel chairs.

BRIEF DESCRIPTION

The present disclosure offers advantages and alternatives over the prior art by providing a rough terrain cart designed to support a wheel chair and a wheel chair user. The cart engages with the wheel chair such that the rotational motion of the drive wheels on the wheel chair are transferred to drive wheels on the cart. The cart enables the wheel chair to be driven over rougher terrain than the wheel chair alone can be driven over. The cart is adjustable to be able to engage wheel chairs configured as either a three wheeled scooter or a four wheeled wheel chair.

An example of a rough terrain cart for a wheel chair in accordance with one or more aspects of the present disclosure includes a frame operable to support a wheel chair and a wheel chair user. A pair of cart drive wheels are rotationally mounted to the frame. A locking mechanism is engaged with the frame. The locking mechanism is operable to secure the wheel chair to the cart. A rotational mechanism is engaged with the frame. The rotational mechanism is configured to support a pair of wheel chair drive wheels of the wheel chair and is operable to enable the wheel chair drive wheels to rotate when the wheel chair is secured to the cart by the locking mechanism. A transmission system is engaged with the frame. The transmission system is connectable to the wheel chair drive wheels. The transmission system is operable to transmit torque from the wheel chair drive wheels to the cart drive wheels.

In accordance with other aspects of the present disclosure a rough terrain cart for a wheel chair includes a frame operable to support a wheel chair and a wheel chair user. A pair of cart drive wheels are rotationally mounted to a rear portion of the frame. A pair of cart steering wheels are rotationally mounted to a front portion of the frame. A locking mechanism is engaged with the frame. The locking mechanism is operable to secure the wheel chair to the cart. A rotational mechanism is engaged with the frame. The rotational mechanism is configured to support a pair of wheel chair drive wheels of the wheel chair and is operable to enable the wheel chair drive wheels to rotate when the wheel chair is secured to the cart by the locking mechanism. A transmission system is engaged with the frame. The transmission system is connectable to the wheel chair drive wheels. The transmission system is operable to transmit torque from the wheel chair drive wheels to the cart drive wheels. A steering platform is mounted on the front portion of the frame. The steering platform is connected to the pair of cart steering wheels of the cart and is connectable to a front wheel of the wheel chair. The steering platform is operable to transfer steering motion from the front wheel of the wheel chair to the pair of cart steering wheels.

DRAWINGS

The disclosure will be more fully understood from the following detailed description taken in conjunction with the accompanying drawings, in which.

Figure 3:
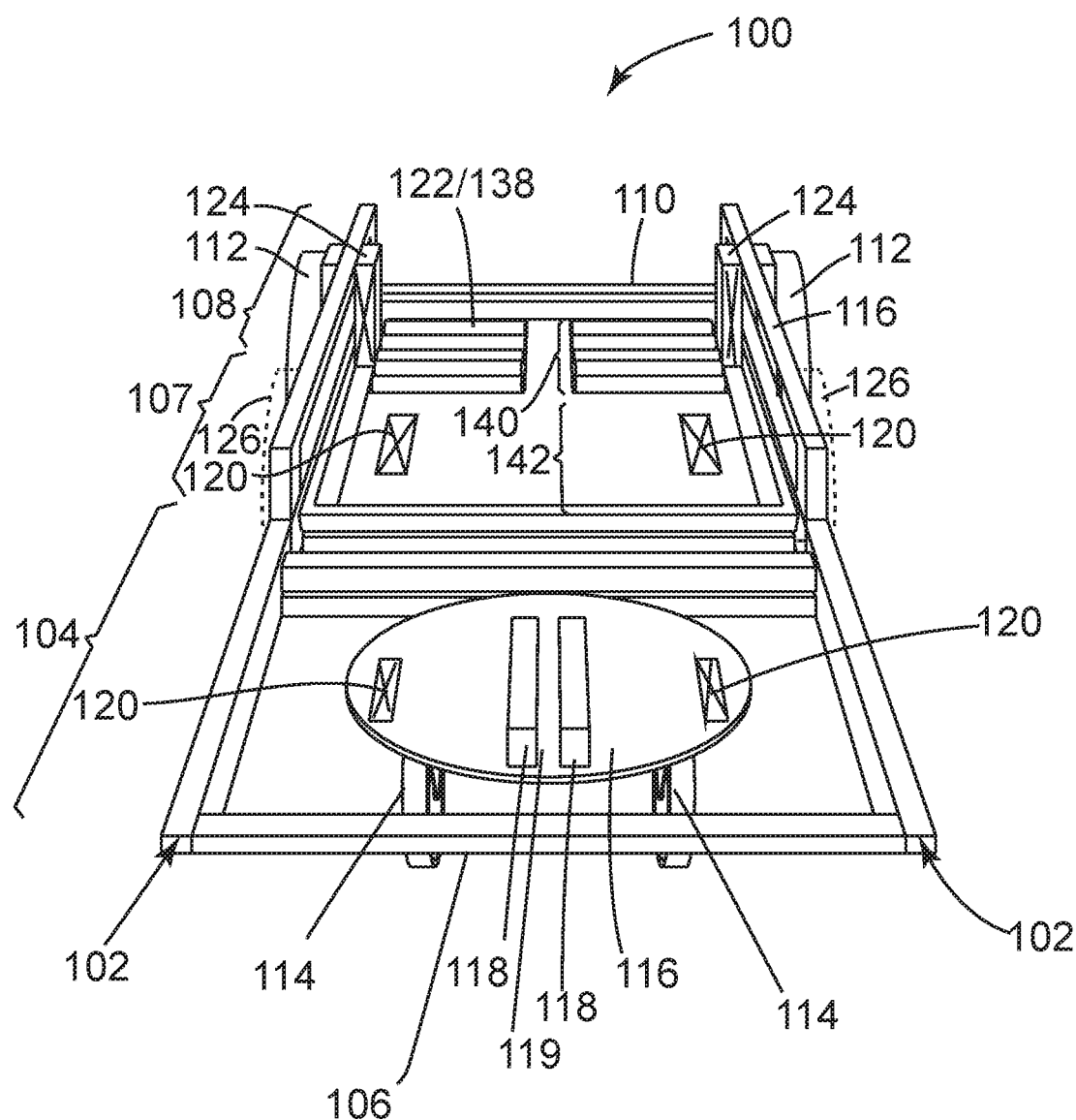
FIG. 3 depicts an example of a perspective front view of a rough terrain cart according to aspects disclosed herein.
Figure 5:
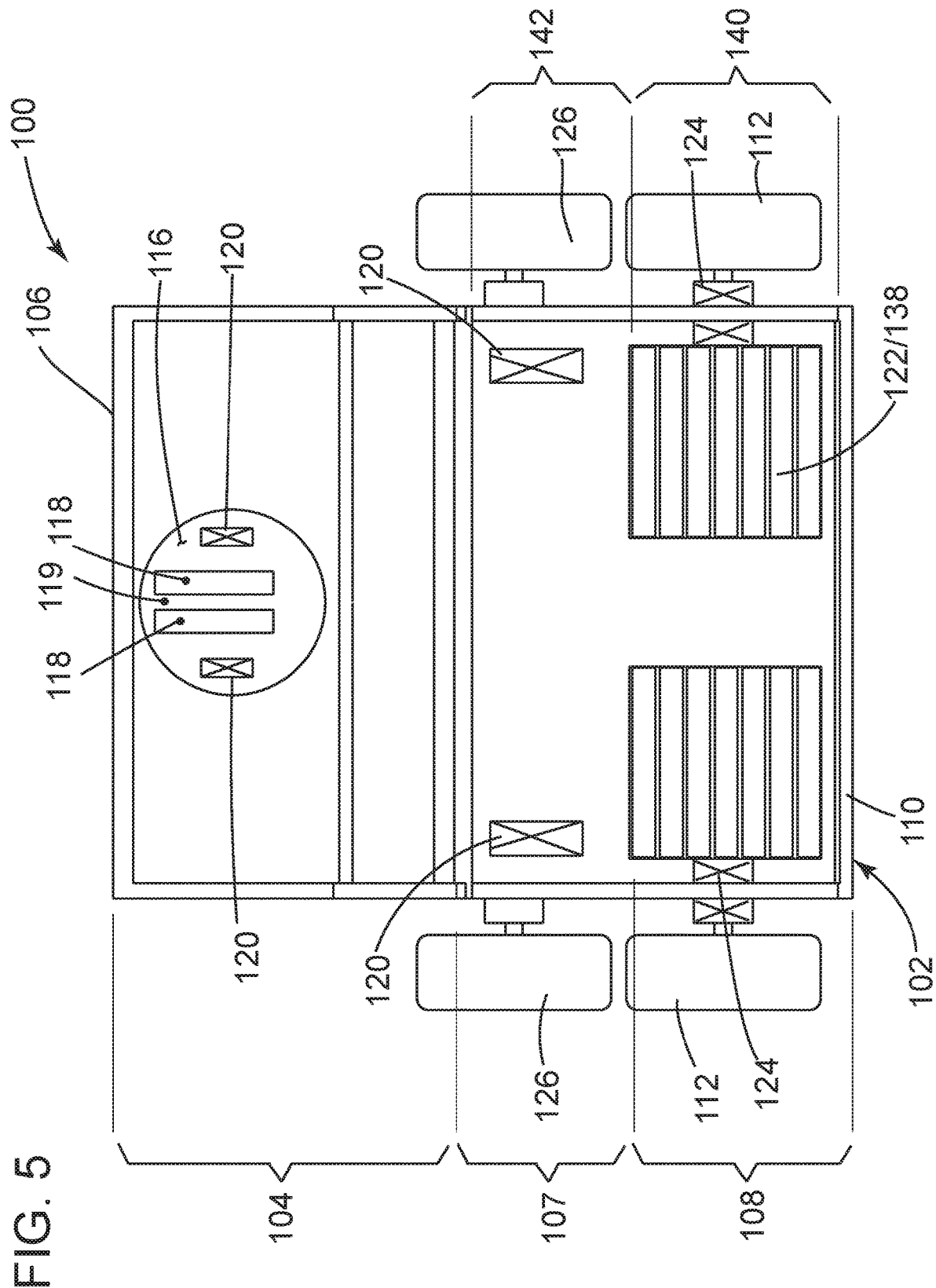
Figure 6:
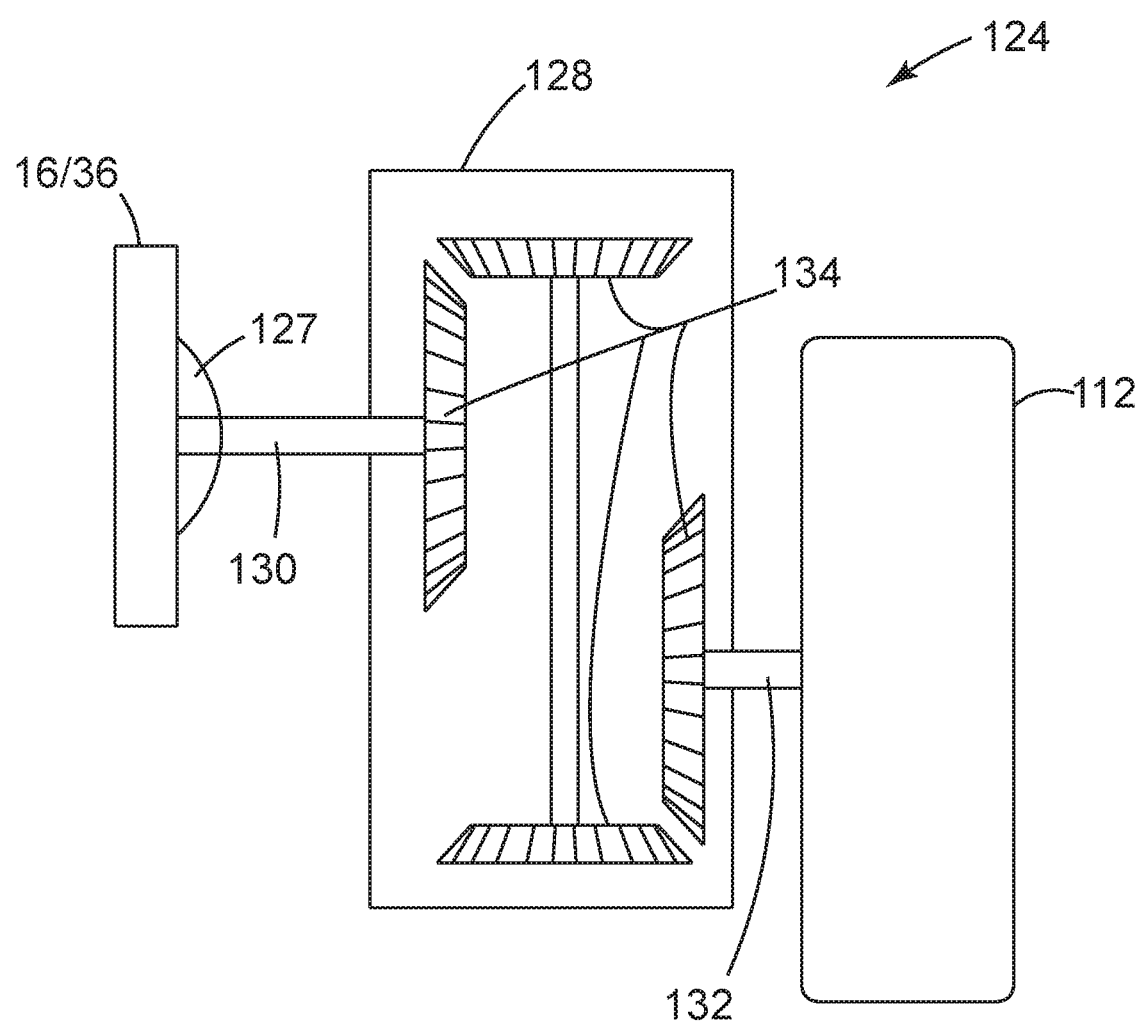
Figure 7:
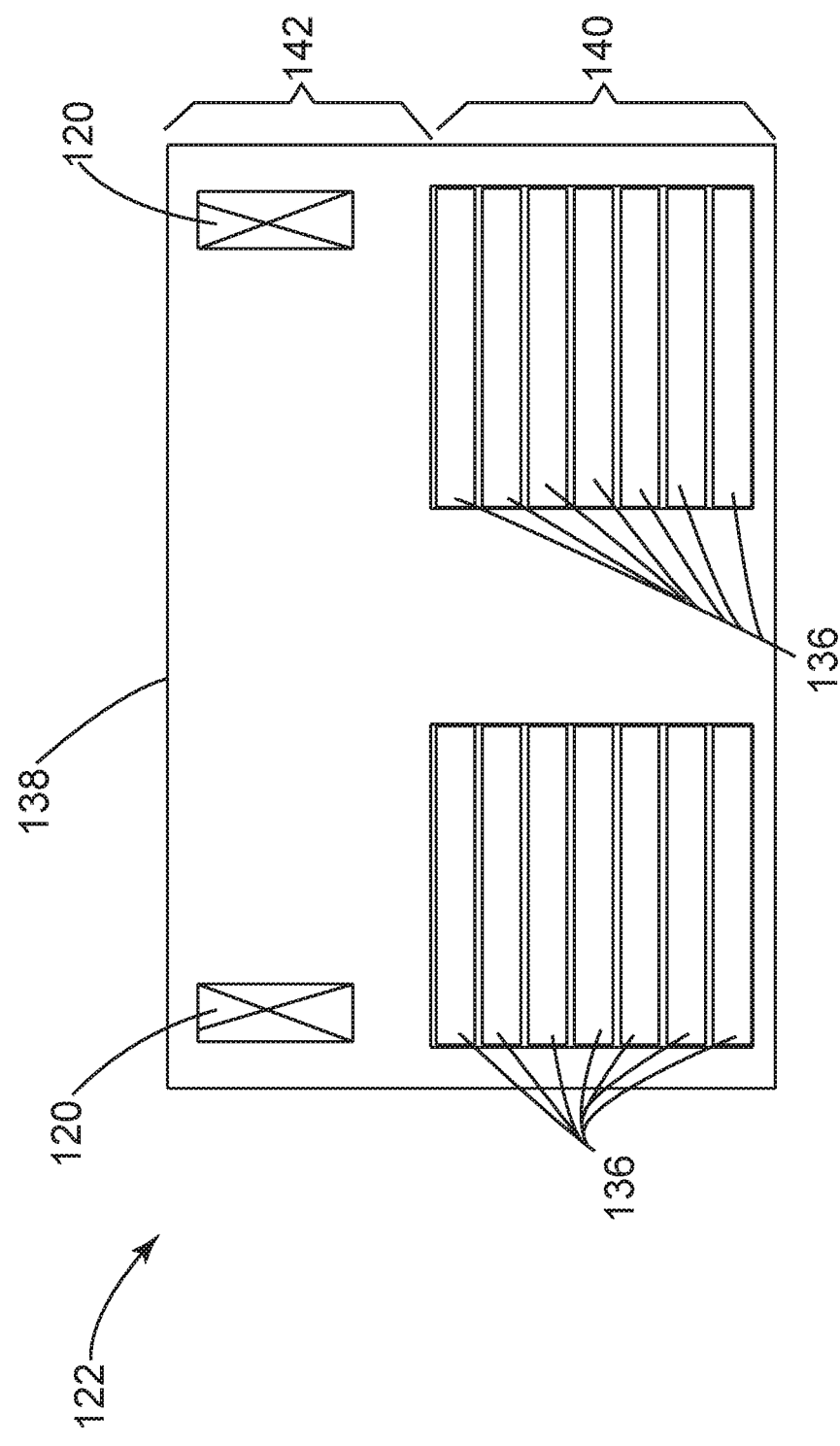
Figure 8:
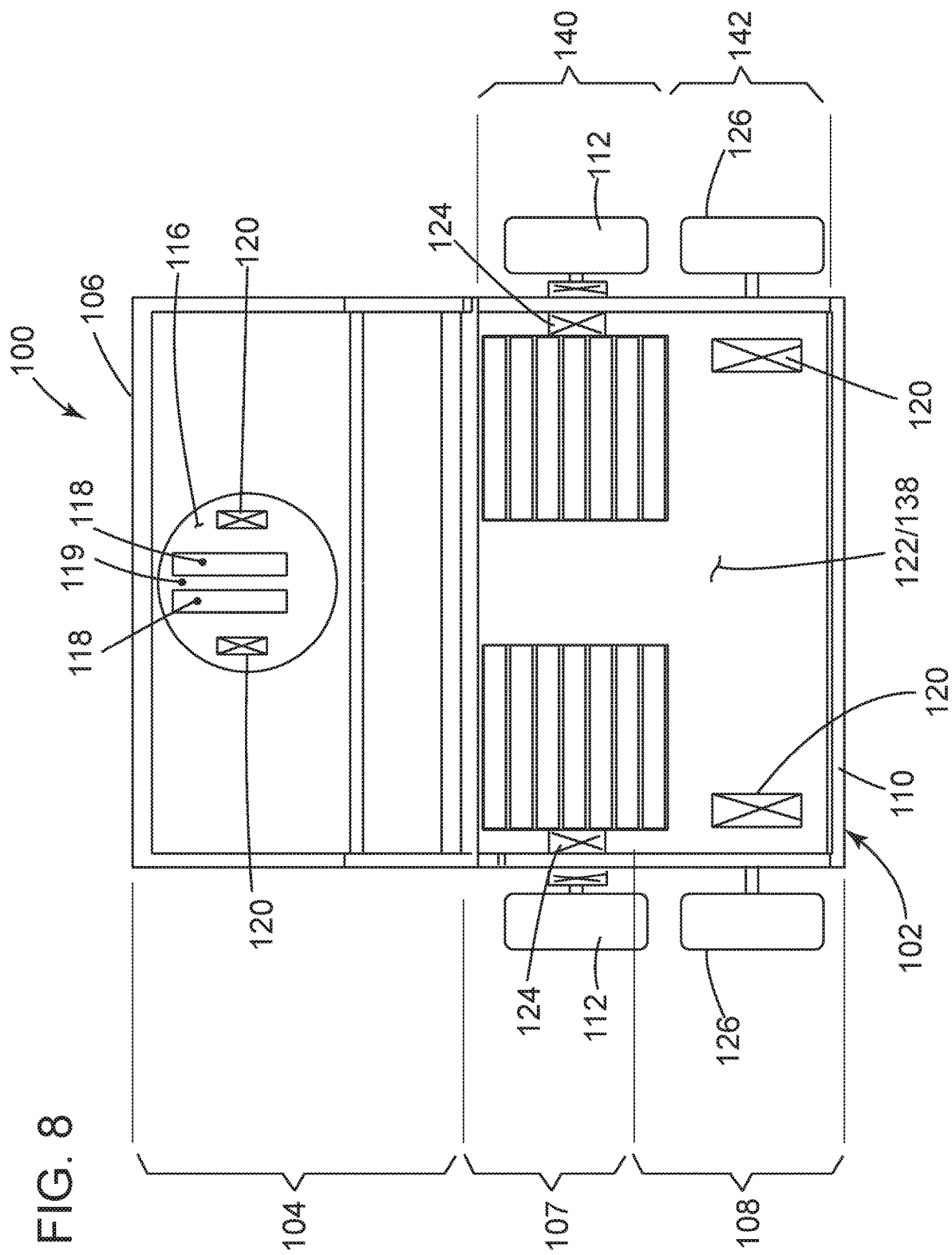
Figure 9:
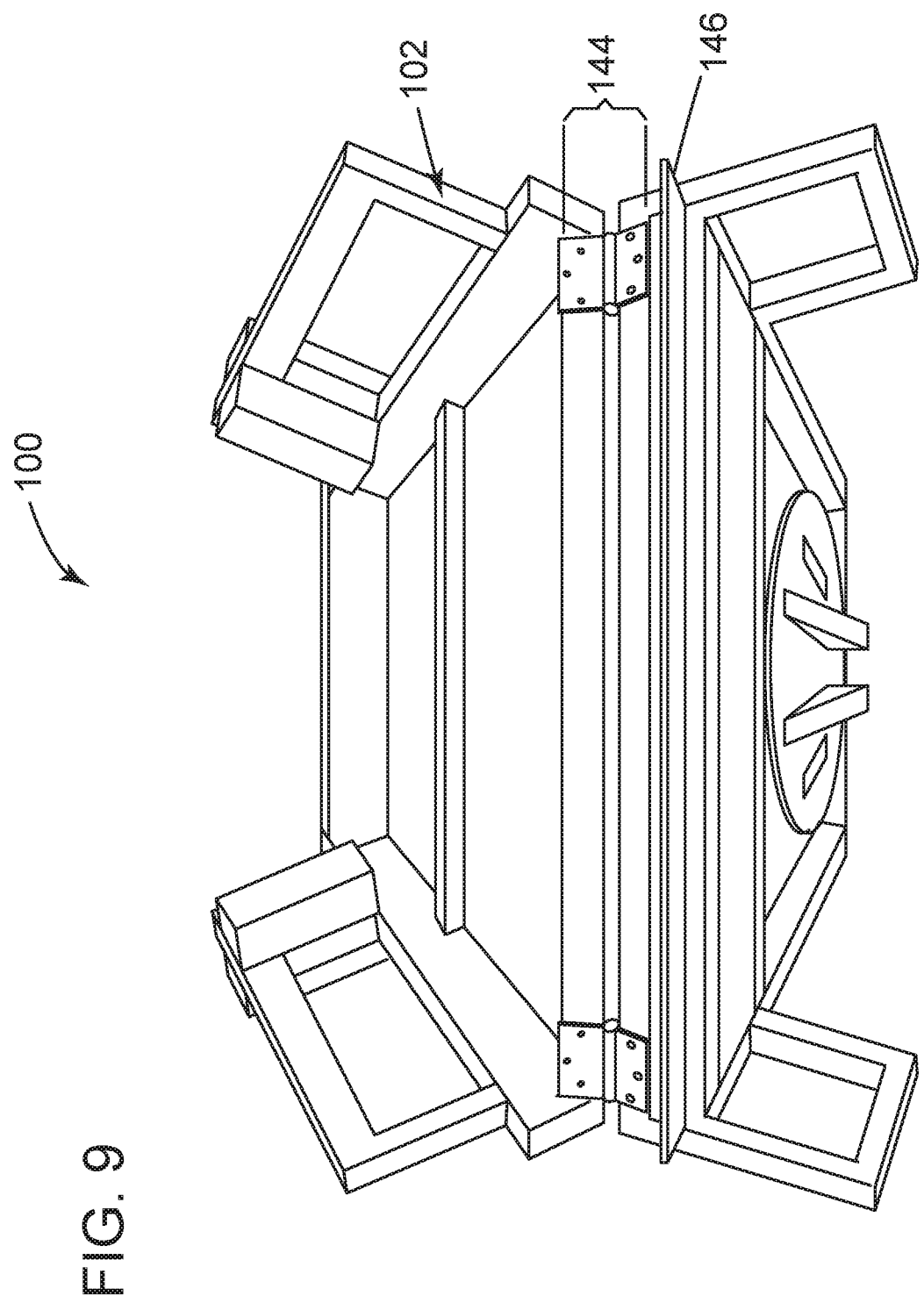
Figure 10:
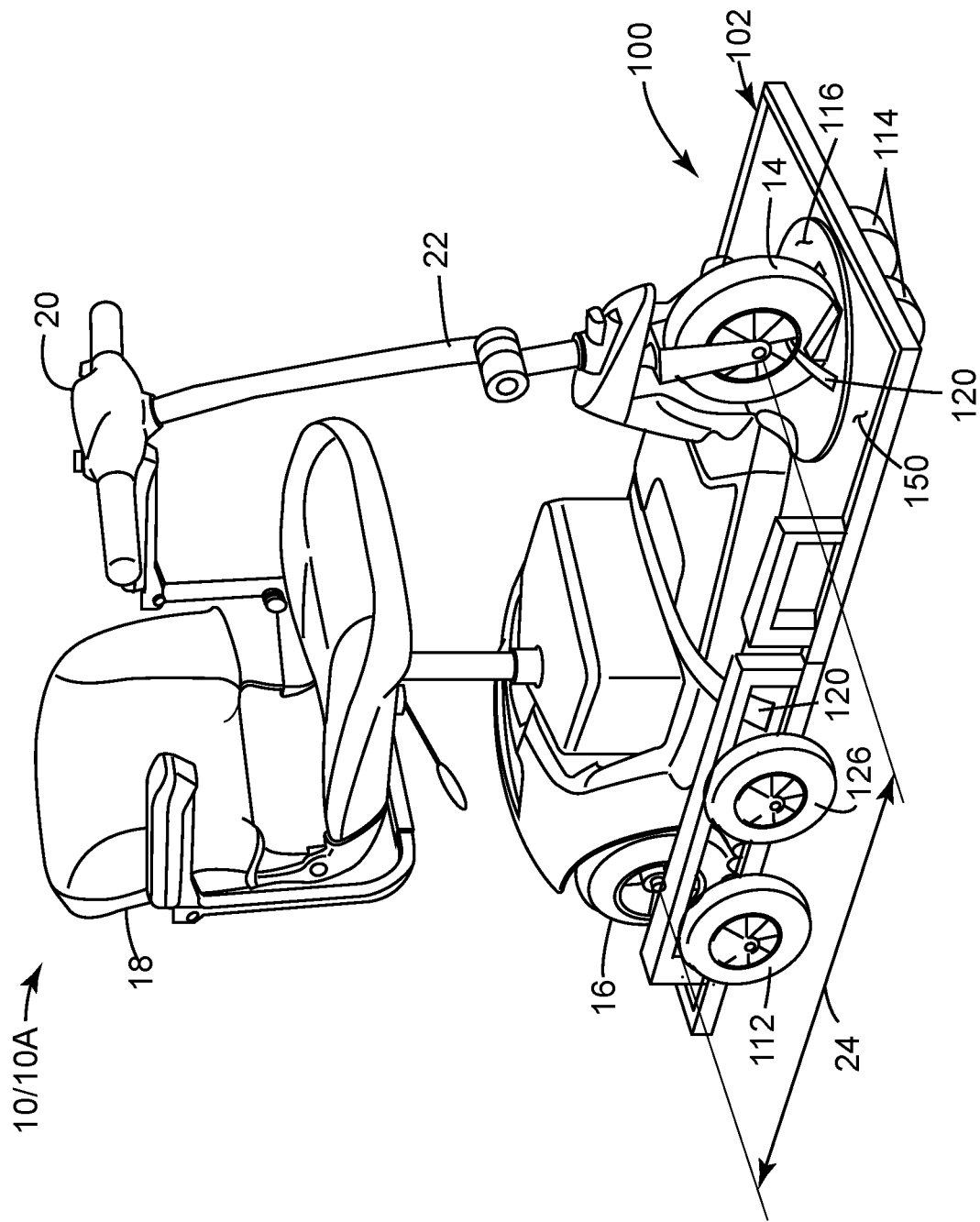

FIG. 5, an example of a top view of the rough terrain cart of FIG. 3 according to aspects disclosed herein;

FIG. 6 depicts an example of a side cut-away view of a transmission system according to aspects disclosed herein;

FIG. 7 depicts an example of a perspective view of a rotational mechanism of the cart of FIG. 3 according to aspects disclosed herein FIG. 8 depicts an example of a top view of the cart of FIG. 3 with a roller platform mounted to a frame in a second roller platform position according to aspects disclosed herein;

FIG. 9 depicts an example of a perspective view of a hinged joint system positioned in the cart frame 102 of FIG. 3 with the cart frame folded into a closed position according to aspects disclosed herein; and FIG. 10 depicts an example of a perspective view of a wheel chair configured as a motorized three-wheeled scooter mounted on a rough terrain cart having a floor according to aspects disclosed herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
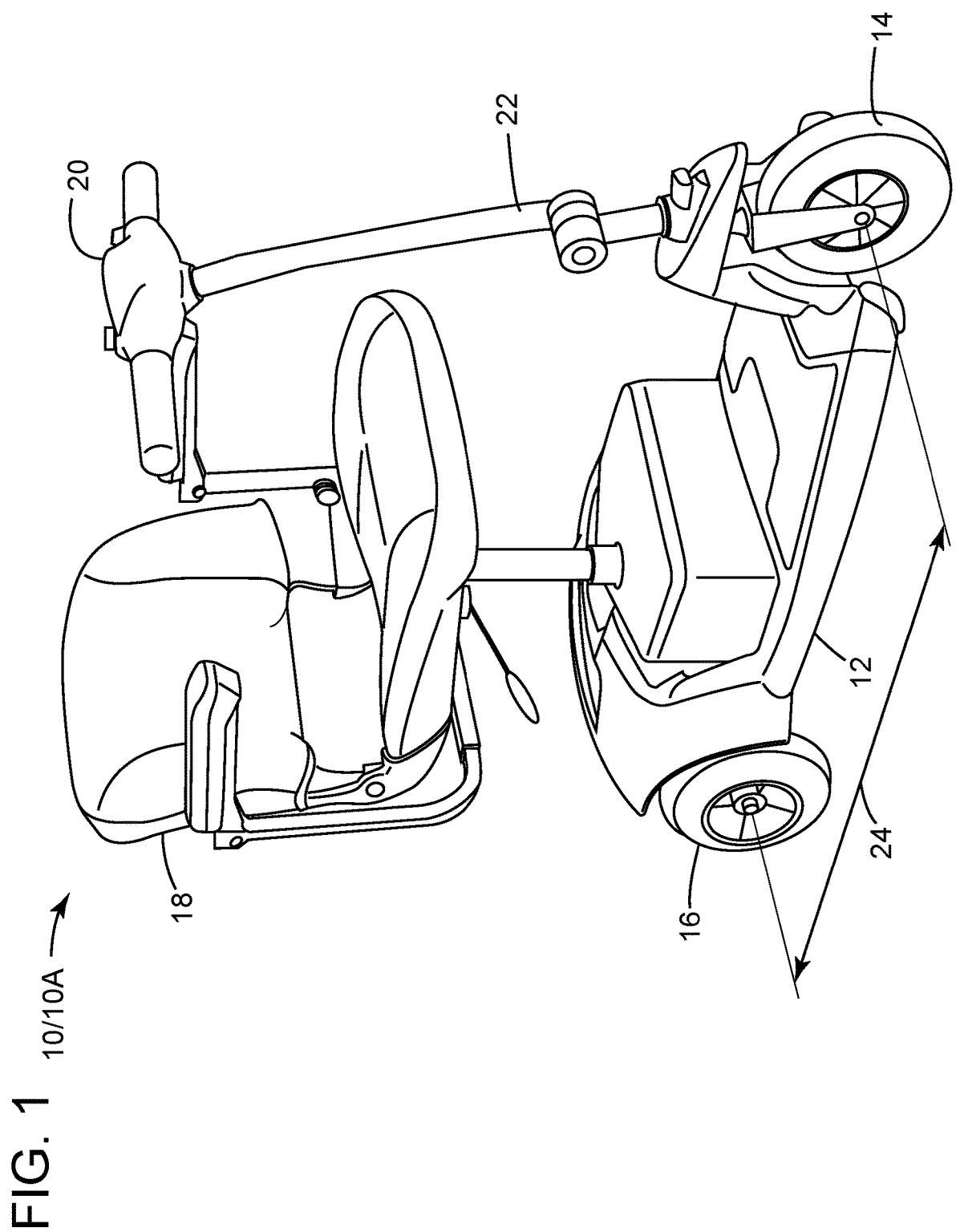
FIG. 1 depicts an example of a perspective view of a wheel chair, configured as a motorized three wheeled scooter.

Referring to FIG. 1, an example of a perspective view of a wheel chair 10, configured as a motorized three wheeled scooter 10A is depicted. The motorized scooter 10A includes a chassis 12 upon which is mounted a single front steering wheel 14 and a pair of rear wheel chair drive wheels 16 that are separated by a predetermined distance 24. A seat 18 for a user is positioned on the chassis 12 intermediate the drive wheels 16 and the front wheel 14. A controls mechanism 20 is connected to the front wheel 14 via steering column 22. The controls mechanism 20 is operable to steer the front wheel 14. An electric motor (not shown) is mounted on the chassis below the seat 18 and is operable to drive the drive wheels 16. As referred to herein, the wheel chair drive wheels are the wheels of a wheel chair 10 that are driven by the electric motor (or other drive mechanism) of the wheel chair. Control functions, such as starting, driving, braking, and steering, are performed by the controls mechanism 20.

Figure 2:
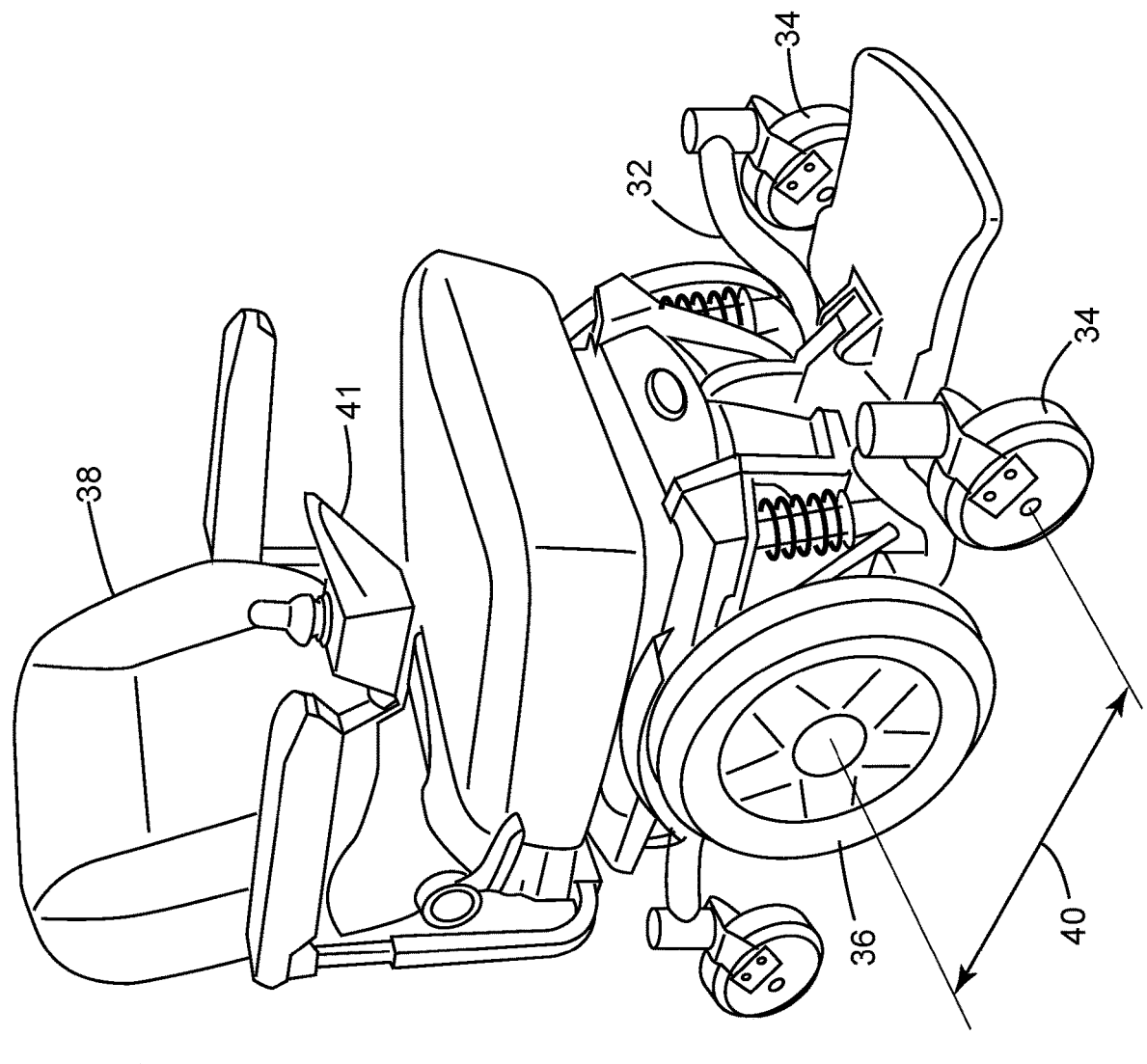
FIG. 2 depicts an example of a perspective view of a wheel chair, configured as a motorized four wheeled wheel chair.

Referring to FIG. 2, an example of a perspective view of a wheel chair 10, configured as a motorized four wheeled wheel chair 10B is depicted. The motorized wheel chair 10B includes a chassis 32 upon which is mounted a pair of front wheel 34 and a pair of rear wheel chair drive wheels 36 that are separated by a predetermined distance 40. A seat 38 for a user is positioned on the chassis 32 directly over the drive wheels 36. An electric motor (not shown) is mounted on the chassis below the seat 38 and is operable to drive the drive wheels 36. A steering and control stick mechanism 41 is operable to steer the wheel chair 10B by driving each rear drive wheel 36 independently of each other. The front wheels 34 swivel as the wheel chair 10B is steered by the drive wheels 36.

Alternatively, the front wheels 34 can be driven by a steering column (not shown) in a similar fashion to that of the steering column 22 of scooter 10A in FIG. 1. In that case the rear drive wheels 36 need not be driven independently of each other.

Because, the seat 38 is positioned directly over the drive wheels 36, the four wheeled wheel chair 10B is relatively shorter than the three wheeled scooter 10A, which has its seat 18 positioned between its drive wheels 16 and front wheel 14. In other words, the distance 40 between the drive wheels 36 and front wheels 34 of the wheel chair 10B is relatively smaller than the distance 24 between the drive wheels 16 and front wheel 14 of the scooter 10A.

Figure 4:
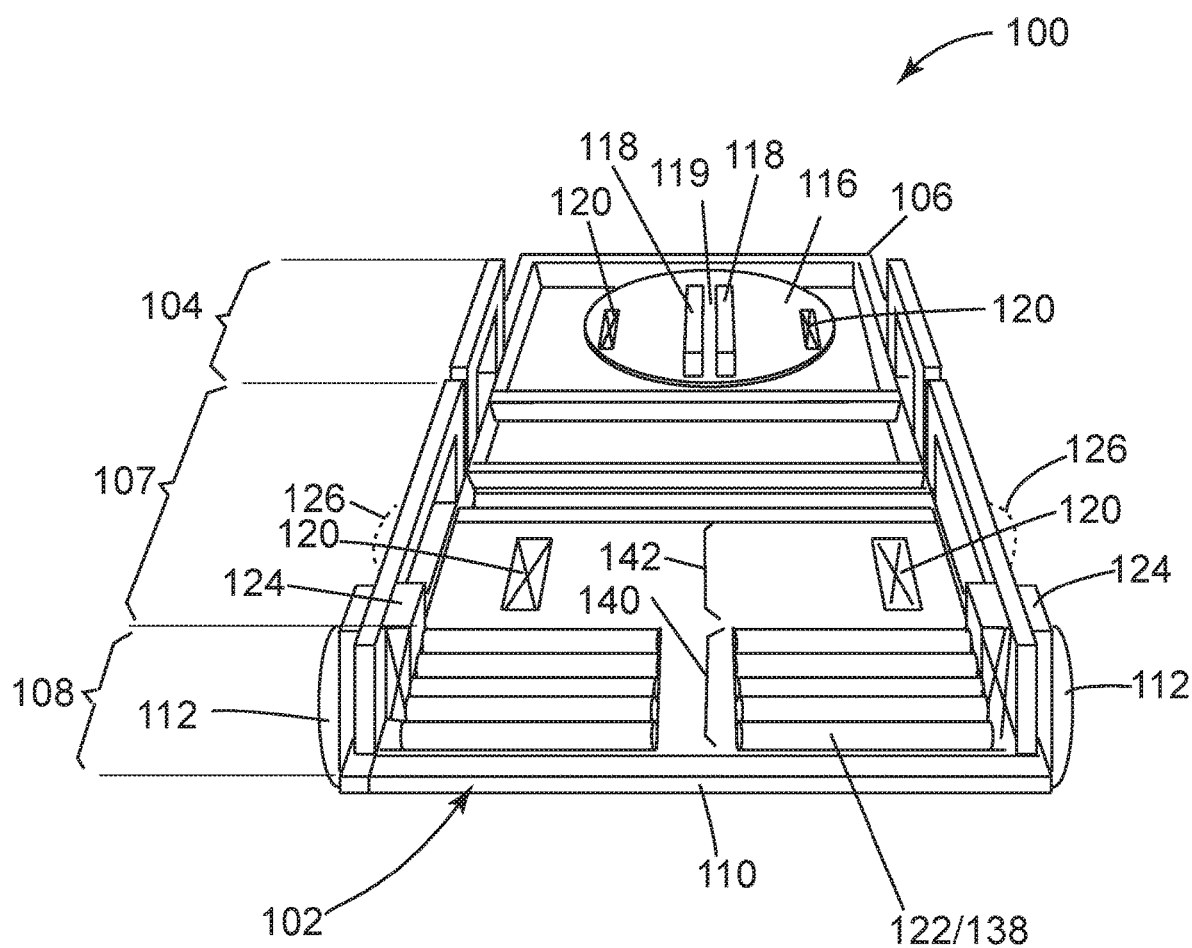
FIG. 4 depicts an example of a perspective rear view of the rough terrain cart of FIG. 3 according to aspects disclosed herein.

Referring to FIGS. 3, 4 and 5, an example of a perspective front view (FIG. 3), a perspective rear view (FIG. 4) and a top view (FIG. 5) of a rough terrain cart 100 is depicted according to aspects disclosed herein. The rough terrain cart 100 is designed to support and secure a wheel chair 10, such as a three wheeled motorized scooter 10A or a four wheeled motorized wheel chair 10B. Cart 100 is adjustable to be able to engage both the scooter 10A and wheel chair 10B. The cart 100 enables a wheel chair 10 to be driven over rougher terrain than the wheel chair alone can be driven over.

The cart 100 includes a frame 102 that is operable to support a wheel chair 10 and a wheel chair user (not shown). The frame 102 includes a front portion 104 having a frame front end 106. The frame 102 also includes a rear portion 108 having a frame rear end 110. The frame also includes an intermediate portion 107 located between the front portion 104 and the rear portion 108.

A pair of cart drive wheels 112 is rotationally mounted to the frame 102. In the example illustrated in FIGS. 3, 4, and 5, the drive wheels 112 are positioned in a first position in the rear portion 108 of the frame 102, close to the frame rear end 110. However, as will be described in greater detail herein, the drive wheels 112 are operable to be positioned in a second position in the intermediate portion 107 of the frame. The first position of the cart drive wheels 112 is to enable engagement with the drive wheels 16 of a three wheeled scooter 10A. The second position of the cart drive wheels 112 is to enable engagement with the drive wheels 36 of a four wheeled wheel chair 10B.

A pair of cart steering wheels 114 is rotationally mounted to the frame 102. The cart steering wheels are positioned in the front portion 104 of the frame 102 near the frame front end 106.

A steering platform 116 is mounted on the front portion 104 of the frame 102. The steering platform 116 is connected to the pair of cart steering wheels 114 of the cart 100. The steering platform 116 is also connectable to a front wheel 14, 34 of a wheel chair 10. The steering platform 116 is operable to transfer steering motion from the front wheel 14, 34 of the wheel chair 10 to the pair of cart steering wheels 114. In the example of FIGS. 3, 4 and 5, the steering platform 116 is operable to be pivoted by the front wheel 14, 34 of the wheel chair 10 in order to transfer the steering motion from the front wheel of a wheel chair to the cart steering wheels.

Two front wheel braces 118 are positioned on the steering platform 116. The braces 118 extend longitudinally parallel to each other and are spaced apart to form a slot 119.

If a wheel chair 10 configured as a three wheeled scooter 10A is mounted on the cart 100, the single front wheel 14 of the scooter 10A fits into the slot 119 between the braces 118. As such, motion of the scooter front wheel 14 may be transferred to the cart steering wheels 114 through the steering platform 116 and vice versa as the wheel 14 presses against the inside surface of the braces 118 to pivot the steering platform 116.

If a wheel chair 10 configured as a four wheeled wheel chair 10B is mounted on the cart 100, the pair of front wheels 34 of the wheel chair 10B may straddle the braces 118. As such, motion of the wheel chair front wheels 34 may be transferred to the cart steering wheels 114 through the steering platform 116 and vice versa as the wheels 34 press against the outside surfaces of the braces 118 to pivot the steering platform 116.

The wheel chair front wheels 34 may be steered directly from a steering column (not shown) in much the same manner as the scooter front wheel 14 is steered. Alternatively, the wheel chair front wheels 34 may just pivot as steering is accomplished by individual control of each wheel chair drive wheel 36. In either case, the motion of the front wheels 34 is transferred to the motion of the cart steering wheels 114.

A locking mechanism 120 is engaged with the frame 102. The locking mechanism may be configured, for example, as a system of straps (as best seen in FIG. 9). The locking mechanism 120 is operable to secure the wheel chair 10 to the cart 100. Portions of the locking mechanism 120 may be located in the front portion 104 and/or the rear portion 108 of the frame 102. The locking mechanism 120 is positioned throughout the cart 100 to secure and hold the wheel chair 10 in place relative to the cart 100.

A rotational mechanism 122 is engaged with the frame 102. The rotational mechanism 122 is configured to support the pair of wheel chair drive wheels 16, 36 of the wheel chair 10. The rotational mechanism 122 is operable to enable the wheel chair drive wheels 16, 36 to rotate when the wheel chair 10 is secured to the cart 100 by the locking mechanism 120.

As will be explained in greater detail herein, the rotational mechanism 122 may be configured as a roller platform 138 (best seen in FIG. 7) that can be detached from the frame 102. The roller platform 138 has a first roller portion 140 and a second non-roller portion 142. The roller platform 138 in FIGS. 3, 4, and 5 is illustrated in a first position, wherein the first roller portion is positioned in the rear portion 108 of the frame 102. However, as illustrated in FIG. 8, the roller platform 138 may be disposed in a second position, that is turned 180 degrees relative to the first position and wherein the first roller portion is positioned in the intermediate portion 107 of the frame 102. The first position of the roller platform 138 is to enable engagement of the cart drive wheels 112 with the drive wheels 16 of a three wheeled scooter 10A. The second position of the roller platform 138 is to enable engagement of the cart drive wheels 112 with the drive wheels 36 of a four wheeled wheel chair 10B.

Though the rotational mechanism 122 is illustrated herein as a roller platform 138, other configurations of the rotational mechanism 122 are within the scope of this disclosure. For example, the rotational mechanism may be a fixed set of rollers that may be mounted in only one fixed position and may not be turned 180 degrees. Also, by way of example, the rotational mechanism 122 may include a set of treads, rather than a set of rollers.

At least a portion of the locking mechanism 120 may be mounted on the non-roller portion 142 of the roller platform 138. The portion of the locking mechanism 120 mounted on the non-roller portion 142 of the roller platform 138 is operable to secure the wheel chair 10 to the cart 100.

A pair of transmission systems 124 is engaged with the frame 102 and are connected to each cart drive wheel 112. The transmission systems 124 are connectable to the wheel chair drive wheels 16, 36. The transmission systems 124 are operable to transmit torque from the wheel chair drive wheels 16, 40 to the cart drive wheels 112.

A pair of cart stabilizing wheels 126 is rotationally mounted to the frame 102. The stabilizing wheels 126 provide additional stability to the cart 100 when driving over rough terrain. In the example illustrated in FIGS. 3, 4, and 5, the stabilizing wheels 126 are positioned in a first position in the intermediate portion 107 of the frame 102. However, as will be described in greater detail herein, the stabilizing wheels 126 are operable to be positioned in a second position in the rear portion 108 of the frame 102. The first position of the stabilizing wheels 126 is to enable engagement of the cart drive wheels 112 with the drive wheels 16 of a three wheeled scooter 10A. The second position of the stabilizing wheels 126 is to enable engagement of the cart drive wheels 112 with the drive wheels 36 of a four wheeled wheel chair 10B.

Referring to FIG. 6, an example of a side cut-away view of a transmission system 124 is depicted according to aspects disclosed herein. The transmission system 124 may include a hub connector 127 that is connectable to the drive wheels 16, 36 of a wheel chair 10. A gear box system 128 includes an input shaft 130 connected to the hub connector 127 and an output shaft 132 connected to the cart drive wheels 112. The gear box system 128 may include a variety of gears 134 that are rotationally mounted within the gear box system 128. The gears 134 are designed to transfer the torque from the wheel chair drive wheels 16, 36 to the cart drive wheels 112.

During operation, torque from each wheel chair drive wheel 16, 36 is transmitted through the input shaft 130 and into the gear box 128 of each transmission system 124. The gears 134 of the gear box 128 then transmit that torque through the output shaft 132 and into the drive wheels 112 of the cart 100.

In the example illustrated in FIGS. 3, 4, and 5, the transmission systems 124 are positioned in a first position in the rear portion 108 of the frame 102, just over the drive wheels 112. However, as will be described in greater detail herein, the transmission systems 124 are operable to be positioned in a second position in the intermediate portion 107 of the frame 102. The first position of the transmission systems 124 is to enable engagement of the cart drive wheels 112 with the drive wheels 16 of a three wheeled scooter 10A. The second position of the transmission systems 124 is to enable engagement of the cart drive wheels 112 with the drive wheels 36 of a four wheeled wheel chair 10B.

Referring to FIG. 7, an example of a perspective view of the rotational mechanism 122 of the cart 100 is depicted according to aspects disclosed herein. The rotational mechanism 122 includes a plurality of rollers 136 sized to receive and support the pair of wheel chair drive wheels 16, 36 and to enable the wheel chair drive wheels 16, 36 to rotate thereon.

The rotational mechanism 122 includes a roller platform 138 upon which the plurality of rollers 136 are mounted. The roller platform 138 is removably attached to the frame 102.

The roller platform 138 includes a first roller portion 140 having the rollers 136 mounted thereon. The roller platform 122 also includes a second non-roller portion 142 having no rollers mounted thereon. The second non-roller portion 142 may include portions of the locking mechanism 120 mounted thereon.

Referring to FIG. 8, an example of a top view of the cart 100 with the roller platform 138 mounted to the frame in a second roller platform position is depicted according to aspects disclosed herein. The roller platform 138 is operable to be mounted to the frame 102 in a first roller platform position (best seen in FIG. 5) and a second roller platform position (best seen in FIG. 8).

In the first roller platform position, the first roller portion 140 is positioned more rearward relative to the frame 102 than the second non-roller portion 142. In this particular example, when the roller platform 138 is in the first roller platform position, the first roller portion 140 is in the rear portion 108 of the frame 102 and the second non-roller portion 142 is in the intermediate portion 107 of the frame 102.

In the second roller platform position, the second non-roller portion 142 is positioned more rearward relative to the frame 102 than the first roller portion 140. In this particular example, when the roller platform 138 is in the second roller platform position, the first roller portion 140 is in the intermediate portion 107 of the frame 102 and the second non-roller portion 142 is in the rear portion 108 of the frame 102.

At least a portion of the locking mechanism 120 is mounted on the non-roller portion 142 of the roller platform 138. The portion of the locking mechanism mounted to the roller platform 138 is operable to secure the wheel chair 10 to the cart 100.

The pair of cart drive wheels 112 and the pair of transmission systems 124 are each operable to be adjustably positioned from a first position in the rear portion 108 of the frame 102 to a second position in the intermediate portion 107 of the frame 102.

When the cart drive wheels 112 and associated transmission systems 124 are in their respective first positions, the transmission systems are operable to connect to wheel chair drive wheels 16 of a first wheel chair 10 and to transmit torque from the wheel chair drive wheels 16 of the first wheel chair 10 to the cart drive wheels 112. In this case, the first wheel chair 10 is configured as a three wheeled scooter 10A.

When the cart drive wheels 112 and associated transmission systems 124 are in their respective second positions, the transmission system is operable to connect to wheel chair drive wheels 36 of a second wheel chair 10 and to transmit torque from the wheel chair drive wheels 36 of the second wheel chair 10 to the cart drive wheels 112. In this case, the second wheel chair 10 is configured as a four wheeled wheel chair 10B.

Additionally, the pair of cart stabilizing wheels 126 are operable to be adjustably positioned from a first position in the intermediate portion 107 of the frame 102 to a second position in the rear portion 108 of the frame 102.

When the pair of cart drive wheels 112 are positioned in their first position in the rear portion 108 of the cart 100, the pair of cart stabilizing wheels 126 are positioned in their first position in the intermediate portion 107 of the cart 100 to aid in stabilizing the cart. When the pair of cart drive wheels 112 are positioned in their second position in the intermediate portion 107 of the cart 100, the pair of cart stabilizing wheels 126 are positioned in their second position in the rear portion 108 of the cart 100 to aid in stabilizing the cart 100.

Referring to FIG. 9, an example of a perspective view of a hinged joint system 144 positioned in the cart frame 102 with the cart frame 102 folded into a closed position is depicted according to aspects disclosed herein. The hinged joint system is operable to fold the cart frame 102 from a frame open position to a frame closed position. In the frame open position, the front portion 104, intermediate portion 107 and rear portion 108 of the frame 103 are substantially parallel to the floor. In the frame closed position, the front portion 104 folds against the intermediate and rear portions 107, 108.

A support ramp 146 is engaged with the frame 102. The support ramp 146 is operable to cover at least a portion of the hinged joint system 144 when the frame 102 is in the open position to enable a front wheel 14, 34 of the wheel chair 10 to roll over the support ramp 146 without contacting the hinged joint system 144.

During operation, a wheel chair 10 will drive up an access ramp (not shown) positioned on the rear end 110 of the frame 102. If the wheel chair 10 is configured as a three wheeled scooter 10A, the roller platform 138 will be positioned in its first position. In the first position of the roller platform 138, the first roller portion 140 of the roller platform 138 is positioned in the rear portion 108 of the frame 102 and the second non-roller portion 142 of the roller platform is positioned in the intermediate portion 107 of the frame 102.

The front wheel 14 of the scooter 10A will drive over the support ramp 146 covering the hinged joint system 144 and onto the steering platform 116. The front wheel 14 will fit into the slot 119 between braces 118 of the steering platform 116, which enables the front wheel 14 to pivot the steering platform 116.

The cart drive wheels 112 and transmission system 124 will be in their first position in the rear portion 108 of the frame 102. The stabilizing wheels 126 will also be in their first position in the intermediate portion 107 of the frame 102.

Due to the predetermined distance 24 between the wheel chair front wheel 14 and wheel chair drive wheels 16 of the scooter 10A, the drive wheels 16 will rest on the rollers 136 of the roller platform 138, which will be positioned in the rear portion 108 of the frame 108 on the first roller portion 140 of the roller platform 138. Accordingly, the transmission system 124 may be connected to the hub of the scooter drive wheels 16.

Portions of the locking mechanism 120, may be mounted on the second non-roller portion 142 of the roller platform 138 and on the steering platform 116. As such, the locking mechanism may then be engaged with the scooter 10A. The locking mechanism 120 is operable to hold the scooter rigidly in place relative to the cart 100.

When the scooter 10A is driven, the rollers 136 allow the scooter drive wheels 16 to turn, while the locking mechanism 120 holds the scooter in place relative to the cart 100. The torque generated by the scooter drive wheels 16 is then transferred via the transmission system 124 to the cart drive wheels 112 to drive the cart 100.

Also during operation, if the wheel chair 10 is configured as a four wheeled wheel chair 10B, the roller platform 138 will be positioned in its second position. In the second position of the roller platform 138, the first roller portion 140 of the roller platform 138 is positioned in the intermediate portion 107 of the frame 102 and the second non-roller portion 142 of the roller platform is positioned in the rear portion 108 of the frame 102.

The front wheels 34 of the wheel chair 10B will drive over the support ramp 146 covering the hinged joint system 144 and onto the steering platform 116. The front wheels 34 will straddle the braces 118 of the steering platform 116, which enables the front wheels 34 to pivot the steering platform 116.

The cart drive wheels 112 and transmission system 124 will be in their second position in the intermediate portion 107 of the frame 102. The stabilizing wheels 126 will also be in their second position in the rear portion 108 of the frame 102.

Due to the shorter predetermined distance 40 (relative to the distance 24 of scooter 10A) between the wheel chair front wheels 34 and wheel chair drive wheels 36 of the wheel chair 10B, the drive wheels 36 will rest on the rollers 136 of the roller platform 138. The drive wheels 36 will be positioned in the intermediate portion 107 of the frame 108 on the first roller portion 140 of the roller platform 138. Accordingly, the transmission system 124 may be connected to the hub of the wheel chair drive wheels 36.

Portions of the locking mechanism 120 may be mounted on the second non-roller portion 142 of the roller platform 138 and on the steering platform 116. As such, the locking mechanism may then be engaged with the wheel chair 10B. The locking mechanism 120 is operable to hold the wheel chair rigidly in place relative to the cart 100.

When the wheel chair 10B is driven, the rollers 136 allow the wheel chair drive wheels 36 to turn, while the locking mechanism 120 holds the wheel chair in place relative to the cart 100. The torque generated by the wheel chair drive wheels 36 is then transferred via the transmission system 124 to the cart drive wheels 112 to drive the cart 100.

Referring to FIG. 10, an example of a perspective view of a wheel chair 10 configured as a motorized three-wheeled scooter 10A mounted on a rough terrain cart 100 is depicted according to aspects disclosed herein.

The cart 100 includes a floor 150 to support the cart. Additionally, the locking mechanism 120 is deployed in the form of a pair of straps 120 that secure the scooter 10A to the cart 100. Although the locking mechanism is illustrated as a pair of straps, other reasonable locking mechanisms may also be used. For example, the locking mechanism may include a system of clamps.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A rough terrain cart for a wheel chair, the cart comprising:
   a frame operable to support a wheel chair and a wheel chair user;
   a pair of cart drive wheels rotationally mounted to the frame, the pair of cart drive wheels being operable to be adjustably positioned from a first position in a rear portion of the frame to a second position in an intermediate portion of the frame;
   a rotational mechanism engaged with the frame, the rotational mechanism configured to support a pair of wheel chair drive wheels of the wheel chair and operable to enable the wheel chair drive wheels to rotate when the wheel chair is supported by the cart; and
   a transmission system engaged with the frame, the transmission system connectable to the wheel chair drive wheels, the transmission system operable to transmit torque from the wheel chair drive wheels to the cart drive wheels.

2. The cart of claim 1, comprising a locking mechanism engaged with the frame, the locking mechanism operable to secure the wheel chair to the cart.

3. The cart of claim 1 comprising:
   a pair of cart steering wheels rotationally mounted to a front portion of the frame; and
   a steering platform mounted on the front portion of the frame, the steering platform connected to the pair of cart steering wheels of the cart and connectable to a front wheel of the wheel chair, the steering platform operable to transfer steering motion from the front wheel of the wheel chair to the pair of cart steering wheels.

4. The cart of claim 3 wherein the steering platform is operable to be pivoted by the front wheel of the wheel chair.

5. The cart of claim 4 wherein the steering platform is connectable to a pair of front wheels of the wheel chair.

6. The cart of claim 1, wherein the rotational mechanism comprises a plurality of rollers sized to receive and support the pair of wheel chair drive wheels and to enable the wheel chair drive wheels to rotate thereon.

7. The cart of claim 6, wherein the rotational mechanism comprises a roller platform upon which the plurality of rollers are mounted, the roller platform being removably attached to the frame.

8. The cart of claim 7, wherein the roller platform comprises:
   a first roller portion having the rollers mounted thereon; and
   a second non-roller portion having no rollers mounted thereon.

9. The cart of claim 8, comprising the roller platform being operable to be mounted to the frame in a first roller platform position and a second roller platform position wherein:
   in the first roller platform position, the first roller portion is positioned more rearward relative to the frame than the second non-roller portion, and
   in the second roller platform position, the second non-roller portion is positioned more rearward relative to the frame than the first roller portion.

10. The cart of claim 8, wherein at least a portion of a locking mechanism is mounted on the non-roller portion of the roller platform, the locking mechanism operable to secure the wheel chair to the cart.

11. The cart of claim 1, comprising:
   the transmission system being operable to be adjustably positioned from a first position to a second position;
   wherein, when the cart drive wheels and the transmission system are in their respective first positions, the transmission system is operable to connect to wheel chair drive wheels of a first wheel chair and to transmit torque from the wheel chair drive wheels of the first wheel chair to the cart drive wheels; and
   wherein, when the cart drive wheels and the transmission system are in their respective second positions, the transmission system is operable to connect to wheel chair drive wheels of a second wheel chair and to transmit torque from the wheel chair drive wheels of the second wheel chair to the cart drive wheels.

12. The cart of claim 1 comprising:
   a pair of cart stabilizing wheels rotationally mounted to the frame, the pair of cart stabilizing wheels being operable to be adjustably positioned from a first position in the intermediate portion of the cart to a second position in the rear portion of the cart;

wherein, when the pair of cart drive wheels are positioned in their first position in the rear portion of the cart, the pair of cart stabilizing wheels are positioned in their first position in the intermediate portion of the cart to aid in stabilizing the cart; and wherein, when the pair of cart drive wheels are positioned in their second position in the intermediate portion of the cart, the pair of cart stabilizing wheels are positioned in their second position in the rear portion of the cart to aid in stabilizing the cart.

13. The cart of claim 1 comprising:
a hinged joint system positioned in the cart frame, the hinged joint system operable to fold the cart frame from a frame open position to a frame closed position; and
a support ramp engaged with the frame, the support ramp being operable to cover a portion of the hinged joint system when the frame is in the open position to enable a front wheel of the wheel chair to roll over the support ramp without contacting the hinged joint system.

14. A rough terrain cart for a wheel chair, the cart comprising:
a frame operable to support a wheel chair and a wheel chair user;
a pair of cart drive wheels rotationally mounted to a rear portion of the frame;
a pair of cart steering wheels rotationally mounted to a front portion of the frame;
a locking mechanism engaged with the frame, the locking mechanism operable to secure the wheel chair to the cart;
a rotational mechanism engaged with the frame, the rotational mechanism configured to support a pair of wheel chair drive wheels of the wheel chair and operable to enable the wheel chair drive wheels to rotate when the wheel chair is secured to the cart by the locking mechanism;
a transmission system engaged with the frame, the transmission system connectable to the wheel chair drive wheels, the transmission system operable to transmit torque from the wheel chair drive wheels to the cart drive wheels, the pair of cart drive wheels and transmission system each being operable to be adjustably positioned from a first position in a rear portion of the frame to a second position in an intermediate portion of the frame; and
a steering platform mounted on the front portion of the frame, the steering platform connected to the pair of cart steering wheels of the cart and connectable to a front wheel of the wheel chair, the steering platform operable to transfer steering motion from the front wheel of the wheel chair to the pair of cart steering wheels.

15. The cart of claim 14, wherein the rotational mechanism comprises:
a roller platform being removably attached to the frame; and
a plurality of rollers mounted onto the roller platform, the plurality of rollers sized to receive and support the pair of wheel chair drive wheels and to enable the wheel chair drive wheels to rotate thereon.

16. The cart of claim 15, wherein the roller platform comprises:
a first roller portion having the rollers mounted thereon;
a second non-roller portion having no rollers mounted thereon; and
the roller platform being operable to be mounted to the frame in a first roller platform position and a second roller platform position wherein:
in the first roller platform position, the first roller portion is positioned more rearward relative to the frame than the second non-roller portion, and
in the second roller platform position, the second non-roller portion is positioned more rearward relative to the frame than the first roller portion.

17. The cart of claim 14, wherein:
when the cart drive wheels and the transmission system are in their respective first positions, the transmission system is operable to connect to wheel chair drive wheels of a first wheel chair and to transmit torque from the wheel chair drive wheels of the first wheel chair to the cart drive wheels; and
when the cart drive wheels and the transmission system are in their respective second positions, the transmission system is operable to connect to wheel chair drive wheels of a second wheel chair and to transmit torque from the wheel chair drive wheels of the second wheel chair to the cart drive wheels.

18. The cart of claim 17 comprising:
a pair of cart stabilizing wheels rotationally mounted to the frame, the pair of cart stabilizing wheels being operable to be adjustably positioned from a first position in the intermediate portion of the cart to a second position in the rear portion of the cart;
wherein, when the pair of cart drive wheels are positioned in their first position in the rear portion of the cart, the pair of cart stabilizing wheels are positioned in their first position in the intermediate portion of the cart to aid in stabilizing the cart; and
wherein, when the pair of cart drive wheels are positioned in their second position in the intermediate portion of the cart, the pair of cart stabilizing wheels are positioned in their second position in the rear portion of the cart to aid in stabilizing the cart.

19. The cart of claim 14 comprising:
a hinged joint system positioned in the cart frame, the hinged joint system operable to fold the cart frame from a frame open position to a frame closed position; and
a support ramp engaged with the frame, the support ramp being operable to cover a portion of the hinged joint system when the frame is in the open position to enable a front wheel of the wheel chair to roll over the support ramp without contacting the hinged joint system.

20. A rough terrain cart for a wheel chair, the cart comprising:
a frame operable to support a wheel chair and a wheel chair user;
a pair of cart drive wheels rotationally mounted to the frame;
a rotational mechanism engaged with the frame, the rotational mechanism configured to support a pair of wheel chair drive wheels of the wheel chair and operable to enable the wheel chair drive wheels to rotate when the wheel chair is supported by the cart,
wherein the rotational mechanism comprises a plurality of rollers sized to receive and support the pair of wheel chair drive wheels and to enable the wheel chair drive wheels to rotate thereon, and
wherein the rotational mechanism comprises a roller platform upon which the plurality of rollers are mounted, the roller platform being removably attached to the frame; and a transmission system engaged with the frame, the transmission system connectable to the wheel chair drive wheels, the transmission system operable to transmit torque from the wheel chair drive wheels to the cart drive wheels.

21. A rough terrain cart for a wheel chair, the cart comprising:
- a frame operable to support a wheel chair and a wheel chair user;
- a pair of cart drive wheels rotationally mounted to the frame;
- a rotational mechanism engaged with the frame, the rotational mechanism configured to support a pair of wheel chair drive wheels of the wheel chair and operable to enable the wheel chair drive wheels to rotate when the wheel chair is supported by the cart;
- a transmission system engaged with the frame, the transmission system connectable to the wheel chair drive wheels, the transmission system operable to transmit torque from the wheel chair drive wheels to the cart drive wheels;
- a hinged joint system positioned in the cart frame, the hinged joint system operable to fold the cart frame from a frame open position to a frame closed position; and
- a support ramp engaged with the frame, the support ramp being operable to cover a portion of the hinged joint system when the frame is in the open position to enable a front wheel of the wheel chair to roll over the support ramp without contacting the hinged joint system.

\* \* \* \* \*